United States Patent [19]
Wilmer

[11] 3,987,413
[45] Oct. 19, 1976

[54] DETECTION SYSTEM

[75] Inventor: Michael E. Wilmer, Palo Alto, Calif.

[73] Assignee: Xerox Corporation, Stamford, Conn.

[22] Filed: Jan. 22, 1975

[21] Appl. No.: 543,024

[52] U.S. Cl. ............................ 340/146.3 AG; 178/5; 307/235 A; 328/135
[51] Int. Cl.² ........................................... G06K 9/00
[58] Field of Search ........... 340/146.3 AG; 328/127, 328/132, 135, 147, 168; 307/235 R, 235 A; 355/40, 41; 178/5, 7.6

[56] References Cited
UNITED STATES PATENTS

| | | | |
|---|---|---|---|
| 3,004,224 | 10/1961 | Yando | 328/135 X |
| 3,187,305 | 6/1965 | Chiang | 340/146.3 C |
| 3,202,042 | 8/1965 | Jamieson et al. | 340/146.3 AG |
| 3,464,062 | 8/1969 | Jensen | 340/146.3 AG |
| 3,525,869 | 8/1970 | Gubisch | 340/146.3 AG |
| 3,599,148 | 8/1971 | Stern | 340/146.3 AG |
| 3,660,601 | 5/1972 | Dobson | 328/127 |
| 3,879,707 | 4/1975 | Rohrer | 340/146.3 C |

Primary Examiner—Leo H. Boudreau
Attorney, Agent, or Firm—J. E. Beck; T. J. Anderson; A. J. Sarli, Jr.

[57] ABSTRACT

A character segment detection system adapted for use with conventional scanning apparatus comprising translating apparatus disposed to illuminate an area of a page, detection means disposed for sensing the level of reflected light within a predetermined aperture from the paper and for producing an electrical signal indicative thereof, peak detector means connected to the detection means for producing the output signal indicative of the peak of the electrical signal, differentiator means connected to the detection means for producing an output signal indicative of the first derivative of the electrical signal, rectifying means connected to receive the differentiator means output signal for producing an output signal of only one polarity indicative thereof and comparator means connected to receive the electrical signal and the peak detector means and rectifier means output signals for producing an output signal when the sum of the electrical signal and and the peak detector means signal is greater than the differentiator means output signal.

9 Claims, 6 Drawing Figures

DETECTION SYSTEM

BACKGROUND OF THE INVENTION

1. Field of the Invention

The present invention relates to improvements in scanning apparatus and more particularly to electro-optical scanning apparatus which is self-compensated for variations in reflectivity.

2. Description of the Prior Art

In automatic character recognition systems the typical devices include a transported scanner which is passed across a printed page and which, during passing, detects local changes of reflectivity in the printed page to identify the various line forms making up each character. Basic to any such character recognition system therefore is the ability of the scanner to detect the presence of various lines on a piece of paper. Discrimination of lines entails processing of a plurality of variables such as the reflectivity of the paper on which the line is made, the thickness of the line and the strength or contrast of the line. Since any pattern recognition system designed to recognize various characters must not only discriminate the character pattern but must also, based on that discrimination, select recognition characteristics, any degradation or losses of the line form detail has a direct effect on both the accuracy and the fidelity of the pattern recognition system. Accordingly, the prior requirement to any attempts at pattern recognition is the design of a line scanner which is inherently accurate and which is operative for various levels of impression density or symbol distinction. These latter features of a character line are commonly referred to in the art as character contrast.

In the prior art, many threshold techniques have been developed which are particularly adapted to the varying contrast problem in character recognition. Typical of such threshold systems is the system described in U.S. Pat. No. 3,479,642 to M. R. Bartz. This reference properly recognizes the problem of recognition of a line where the line varies both with the typed font and with the life of the typewriter ribbon. This reference utilizes as the threshold generator the generator described in U.S. Pat. No. 2,975,371 and based on that threshold generates line width by counting up the number of black, or below threshold reflectivity, signals picked up by the scanner. The line width is then compared against a typical or average line width and converted to an analog value. Alternatively, variable gain or gain compensated techniques, such as the technique described in U.S. Pat. No. 3,714,397, have been developed. In each case, an average threshold level of reflectivity within the aperture is developed against which changes due to symbol presence are compared, again on an averaged basis, such that the minimum detail recognized is controlled by the dimensions of the scanning aperture.

SUMMARY OF THE INVENTION

It is the general purpose and object of the present invention to provide a symbol segment recognition system which will detect segment characteristics smaller than the aperture size and which furthermore is simple, convenient to maintain, and requires few parts. Other objects of the invention are to provide a circuit which is adapted for use with various scanners and which is responsive to lines of various widths.

Briefly, these and other objects are accomplished within the present invention by providing an improved circuit for line detection which is compatible with optical scanning elements available in systems presently in use, such as the scanner Model No. TC400 Telecopier facsimile transceiver produced by Xerox Corporation. In the TC400 Telecopier facsimile transceiver, and other devices similar in kind, a transported light beam is projected through appropriate lens structure to illuminate a segment of paper on a drum which is periodically advanced in rotation following the completion of each lateral scan of the light beam. The reflection of the beam from the paper is picked up by another set of lenses and directed to a photo detector, such as a conventional photo transistor. The inventive system is in turn connected to receive the output signal from such photo transistor. More particularly, the transistor output is received at a preamplifier which is conventionally adjusted in gain by appropriate feedback potentiometer adjustment. The output of the preamplifier is connected both to the input of a peak detector circuit and to a differentiator circuit. The output of the differentiator circuit is passed across a full wave rectifier and the absolute value of the differentiator output is summed with the peak detector output and the output of the preamplifier. The summing is conventionally accomplished by an amplifier included in a comparator circuit, this latter amplifier being also appropriately adjusted in gain. The amplifier output is connected to the input of a comparator, again configured by appropriate feedback around an operational amplifier.

This configuration is particularly adapted at discriminating the width of the line of dimensions smaller than the aperture for a substantially broad range of line density or line contrast.

DESCRIPTION OF THE SPECIFIC EMBODIMENT

The present invention is described with reference to a conventional facsimile transceiver system such as the Xerox Model No. TC400 Telecopier facsimile transceiver, and while particularly useful in this combination, no intent to limit the scope of the invention is expressed thereby. In addition, the inventive circuit adapted for use with the TC400 Telecopier facsimile transceiver is described by way of linear elements only. Again, the following description shown in this manner is for purposes of example only. It is particularly noted that full equivalency is now available between what is commonly referred to as linear or analog elements and digital elements.

Figure 1:
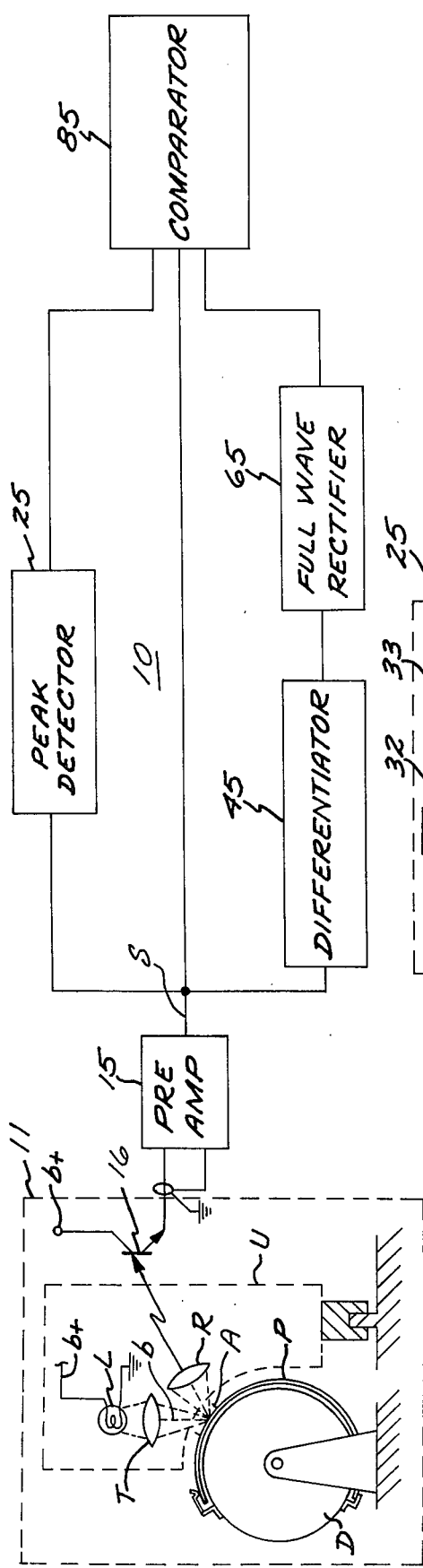
FIG. 1 is a block diagram of the present invention connected for use with a prior art scanning system.

As shown in FIG. 1, the inventive discrimination circuit, comprising the subject detection system and designated by the numeral 10, is illustrated in a useful arrangement as a replacement for the original discrimination circuit in the above-referenced prior art Telecopier TC400 facsimile transceiver. For designation purposes, the generalized facsimile transceiver is shown or designated by the numeral 11. Typically, the generalized facsimile transceiver 11 described above includes a rotary drum D which includes mounting provisions for a sheet of paper P which is to be scanned. Conventionally, the paper P is scanned by reflecting a light beam $b$ emitted from a light source L and focused by a lens T onto the paper P to be reflected to a lens R which then is utilized to excite a conventional photo sensitive device or transistor 16.

Lenses T and R and the light source L together with transistor 16 are carried in a conventional scan assembly U which is automatically articulated along the drum D to scan the paper along a surface line parallel to the axis of the drum D. At each discrete increment of time, one section of the paper P is thereby illuminated and an amount of the illuminated light is reflected from the paper P to lens R in proportional relationship with the local reflectivity of the paper. Any character inscription on the paper is typically in black, which, depending on its size and contrast, absorbs a corresponding amount of the illuminating light. In this manner, only a small area of the paper P is sensed, which is designated as an aperture A in the description following.

The emitter output of the photo sensitive transistor 16 is connected to the input of a preamplifier 15 which conventionally both inverts and amplifies the signal to an amplitude proportional to the signal level out of the transistor 16. The output of the preamplifier 15, shown as signal S, is branched along three legs, one of which is directly connected to one summing junction of a conventional comparator circuit 85. The other two branches are shown connected respectively across a peak detector 25 also to the summing junction of comparator 85 and across a differentiator circuit 45 in series with a full wave rectifier 65 again to the summing node of comparator 85. In this manner, three signal channels are established, at the input of comparator 85, which are combined in a particular manner for operation according to the present invention.

More specifically, as will be described below, the differentiator circuit 45 is built around a high gain operational amplifier such that the input signal is inverted as the first derivative output signal. Accordingly, the output of the differentiator 45 is in complementary algebraic relationship with the output of preamplifier 15. Similarly, the third branch of the signal output of preamplifier 15 includes the peak detector circuit 25 which includes low frequency elements to provide an average peak reflectivity level. As will be shown in more detail hereinbelow, the voltage levels coming out of peak detector 25 are fully adjustable for any one output from the preamplifier 15 such that various sum combinations can be made with the preamplifier 15.

It is to be noted that the scanner transport assembly U is translated across the page P in essentially a continuous manner. Accordingly, the scanner aperture A intercepts, for example from left to right, the various line segments making up each character on the page. Thus as the scanner assembly progresses, a progressively larger lateral segment of the lower reflectivity line is within the aperture with the attendant change in the emitter signal of transistor 16. For line widths smaller than the aperture A, a condition is reached eventually where no further changes in reflectivity occur, i.e., the line segment is fully within the scanned field. Alternatively, for line widths greater than the scanning aperture A, there is an intermediate state where the line segment fills the whole aperture and no further signal changes occur in the output of transistor 16. For similar print densities, a narrow line, however, will produce a higher reflectivity level when fully within the aperture.

Accordingly, while the rise slope in either side of the aperture is the same for equal print densities, the maximum level, and therefore the slope duration, will be less for the narrower line. These characteristics are utilized in the present invention according to the following description.

Figure 2:
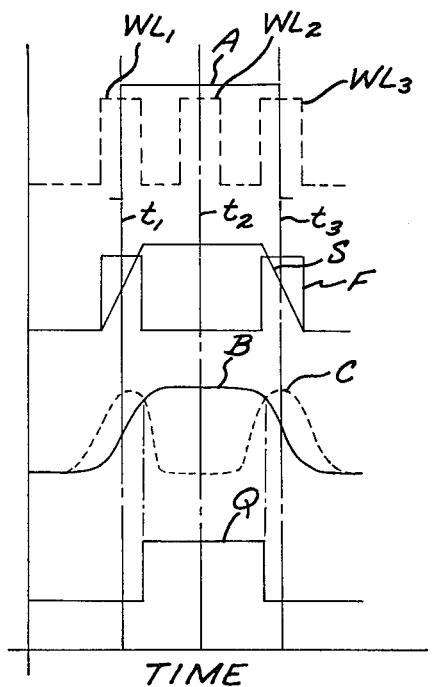
FIG. 2 is a graphical illustration of a thin line signal processed according to the present invention.
Figure 3:
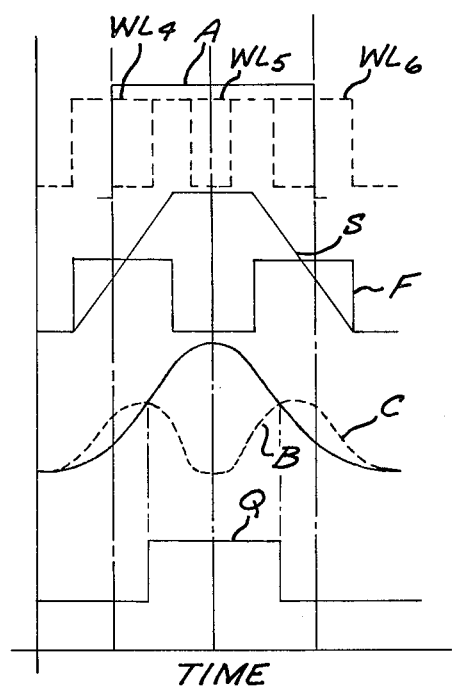
FIG. 3 is again a graphical representation of a broad line signal processed according to the present invention.
Figure 4:
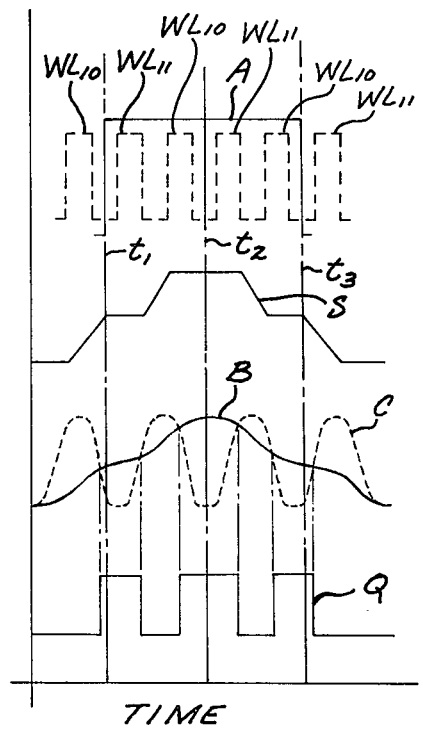
FIG. 4 is a graphical representation of a double line signal processed according to the present invention.

By the way of references to FIGS. 2, 3 and 4, it is noted that in the case where the line progressing across aperture A is shown as charts $WL_1$, $WL_2$ and $WL_3$, at discrete time locations, the width of the line or any of the charts $WL_1$–$WL_3$ is less than the width of the aperture A. The resulting output from preamplifier 15 is a trapezoidal function shown as signal chart S. The full wave rectified derivative of signal S is shown as signal F on the same chart. The next two charts, shown as signal charts B and C, are smoothed charts resulting from phenomena like fringe effects and abberation through the lens R. The resulting difference between signals B and C is shown as a signal Q which corresponds in width to the line segment scanned.

Figure 6:
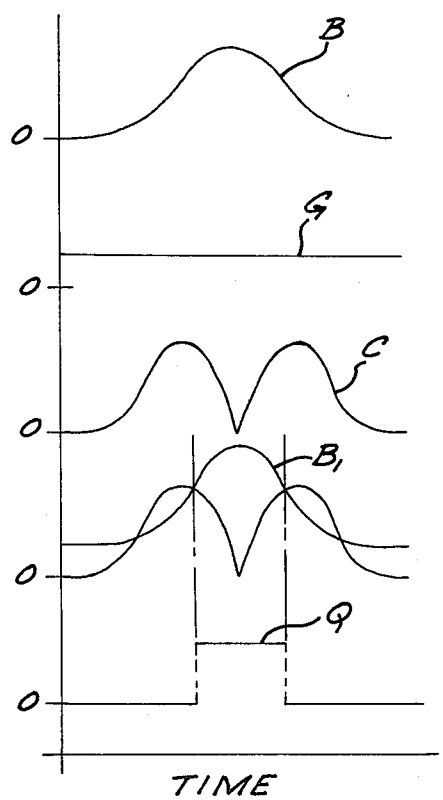
FIG. 6 is a graphical representation of the various signal charts associated with the operation of the circuit shown in FIG. 5.

Because of variation in paper reflectivity and therefore the amplitudes of signals S and F, signal Q shown in FIG. 2 is geometrically unrelated to the width of the line pulses $WL_1$, $WL_2$ and $WL_3$. In FIG. 6, the peak detector 25 output signal G is added to signal B producing a signal trace $B_1$ which by proper selection of gains can be made to match the width of signal Q with the width of the line $WL_1$.

Similarly, the illumination of FIG. 3 shows again the aperture A which is scanned across a line of the width $WL_4$, $WL_5$ and $WL_6$. It is to be understood that the numerical designations or subscripts 4, 5 and 6, are to be considered as illustrating the position of a single line signal at three instances of time shown as time $t_4$, $t_5$ and $t_6$ as the aperture is translated across the paper. In this figure the line width $WL_4$ is wider than the aperture. The signal traces resulting from the translation of such relatively wide line across the aperture produces an algebraic combination at the output of comparator 85 which closely approximates the width of the line or the width of the pulse $WL_4$.

As a further example, the illustration shown in FIG. 4 is taken wherein two lines $WL_{10}$ and $WL_{11}$ are shown translated across the aperture where the line separation is less than the width of aperture A. In most prior art devices, this condition would result in a total loss of information, i.e., the only output from the photo sensitive transistor 16 would be a reduced reflectivity output at a reflectivity average level corresponding to the average density of the lines within the aperture. This illustration most strongly illustrates the benefits of increased information content available by use of the present invention. These benefits, however, are not limited only to this latter situation and are applicable as well to the previous illustrations since in each case a unique relationship is established between the width of the line and signal Q.

Figure 5:
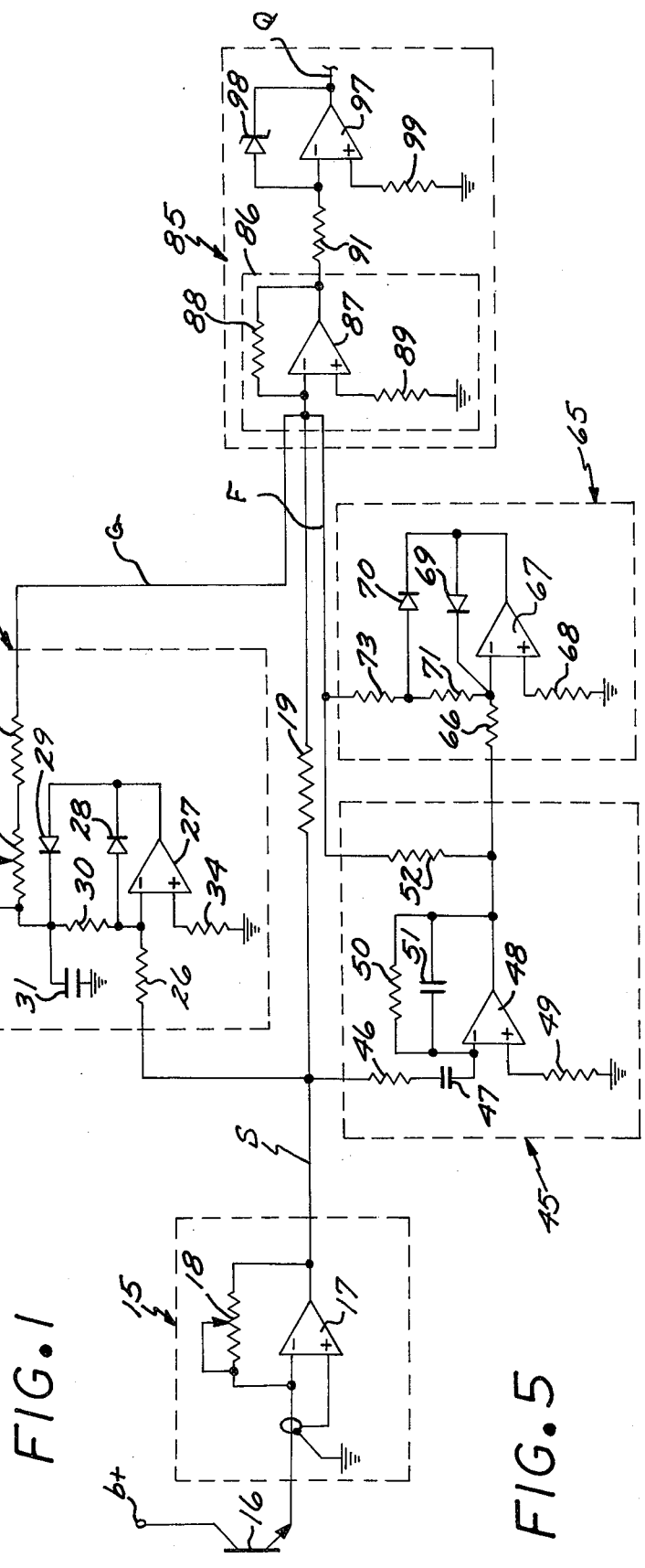
FIG. 5 is a circuit schematic of one specific embodiment of the inventive discrimination circuit shown in FIG. 1.

By the way of references to FIG. 5, one specific embodiment illustrating a circuit devised to perform the above functions is set forth. For convenience in recognition, the same designating numerals are maintained for the major circuit blocks, i.e., the preamplifier 15, the peak detector 25, the differentiator 45, the full wave rectifier 65 and the comparator circuit 85. Also, the signal traces between the major blocks are maintained with the same designating letters.

As shown in FIG. 5, the preamplifier 15 includes a conventional high gain operational amplifier 17, such amplifier being selected from the Fairchild Semiconductor Series No. 741C Operational Amplifiers which is connected to the emitter of a transistor 16 at the negative input terminal and which is grounded at the positive input terminal in common with the shield around the signal lead from the transistor for avoiding ground loops and other sources of signal degradation. The output of the operational amplifier 17 is fed back across an adjustable feedback resistor 18 to the negative terminal in the conventional manner of a closed loop amplifier configured to amplify D.C. voltages and is therefore adjustable in gain. This adjustment of the feedback resistor 18 for gain selection through the preamplifier 15 section allows accommodation of the variations in gain in transistor 16 and other variations. The output signal S of operational amplifier 17 is also connected across an input resistor 26 to the peak detector circuit 25, being connected therein at the negative terminal of yet another operational amplifier 27. Operational amplifier 27, and all other operational amplifiers referred to hereinbelow, are again selected from the Fairchild Semiconductor Series No. 741C chips. The output of amplifier 27 is fed back both to the cathode of a diode 28 and to the anode of a diode 29. The respective other ends, or the anode and cathode of diodes 28 and 29, are connected to two ends of a resistor 30 and the anode of diode 28 is further connected back to the negative terminal of amplifier 27. The cathode of diode 29 is in turn connected across a capacitor 31 to ground and to one end of an adjustable resistor 32. The other end of adjustable resistor 32 is connected in series with an input resistor 33 to the summing junction of the comparator 85 to be further described hereinbelow. To those who are familiar with the art, it will be apparent that a detector circuit is formed by the operational amplifier 27 in combination with the diodes 28 and 29 and the capacitor 31, which will maintain a signal corresponding to the peak paper reflectivity. The positive terminal of the operational amplifier 27 is connected across a resistor 34 to ground. At the same time, the output signal S from the preamplifier 15, or the output of the operational amplifier 17, is also pulled off across an input resistor 19 to the summing node of the comparator circuit 85.

The output signal S of the preamplifier circuit 15 is also connected across an input resistor 46 in series with a capacitor 47 to the negative input terminal of an operational amplifier 48 forming the central amplifier of the differentiator circuit 45. Amplifier 48 is similarly lifted from ground at the positive terminal across a resistor 49. The feedback of amplifier 48 includes a relatively large resistor 50 in parallel with a low-value capacitor 51. The inclusion of resistor 46 and capacitor 51 in the differentiator circuit is to insure proper bandpass and to reject high frequency noise and may be eliminated. Again, one skilled in the art will recognize that the circuit described in the foregoing paragraph is that conforming to the configuration of a differentiator circuit.

The output of the differentiator circuit 45, or the output of amplifier 48, is both tied across an input resistor 52 to the summing node of the comparator circuit 85 and at the same time, across an input resistor 66 to the negative terminal of an operational amplifier 67, around which the full wave rectifier circuit 65 is formed. Again, the positive terminal of amplifier 67 is pulled from ground by an appropriate resistor 68 and the feedback path between the output and negative input includes a forward bias diode 69 and a reverse bias diode 70. The bias of the diodes in this instance is shown in the feedback mode from the output to the input. More specifically, diode 69 is tied at the anode to the output of amplifier 67 and the diode 70 is tied at the cathode to the same terminal. The respective cathode and anode of diodes 69 and 70 connect to the two ends of a resistor 71 and the cathode of diode 69 furthermore connects to the negative input terminal of amplifier 67. The anode of diode 70 also connects across an input resistor 73 to the summing node of the comparator circuit 85.

In this manner, three separate channels are summed at the input of comparator circuit 85, specifically the output of the peak detector circuit 25, the output of the rectifier 65 and the output of the preamplifier 15. The comparator circuit 85 includes a summing amplifier 86 which is built in a conventional manner around an operational amplifier 87 having a feedback resistor 88 and a grounding resistor 89 tied respectively to the negative and positive input terminals thereof. The output of summing amplifier 86 is tied across an input resistor 91 to the negative input of yet another operational amplifier 97 which includes an input-to-output biased Zener diode 98 connected thereacross. Again, the operational amplifier 97 is isolated from ground by a resistor 99. This manner of connection of a Zener diode across operational amplifier 97 effects the switching action of signal Q at approximately the Zener breakdown voltage of diode 98.

The operation of the present invention will now be set forth with reference to FIGS. 1 and 5, and with particular reference to FIGS. 2, 3, 4 and 6. As shown in FIG. 5, the comparator circuit 85 collects the output signal from preamplifier 15 with the differentiator 45 output and the peak detector 25 output. The gain of detector 25 is adjustable. Thus, given a proper combination of gains on the output of preamplifier 15 discrimination between the line width can be made as shown in FIG. 6. In this context, it is necessary to note that for a particular level of contrast the difference in line width can be extracted by way of the comparison made between the rectified differentiator output and the preamplifier output. This feature is most clearly brought home by reference to FIGS. 2 and 3. As will be noted from inspection of FIG. 2, for a given level of contrast constant levels in the differentiator output are achieved. By comparing the rectified differentiator output with the preamplifier output the width of signal Q can be made to follow the width of the line. Such is shown in FIG. 3. Furthermore, variations in line contrast are also accommodated since both the differentiator output and the preamp output vary with contrast and the effect of contrast is effectively taken out. The peak detector 25 provides the additional feature of compensation for paper reflectivity. Accordingly, the circuit is normalized for various levels of peak reflectivity by the peak detector. These circuit functions can be conveniently adjusted in gain to a threshold relationship:

$$V_t = V_{ref} - \left| \frac{dV}{dt} \right|$$

where $V_t$ = threshold voltage, $V_{ref}$ = peak detector voltage, and $|dV/dt|$ = rectified first derivative voltage.

From the above relationship, it should be apparent that the peak detector gain and the differentiator gain are selected to be equal. The above relationship then becomes equivalent to a threshold relationship:

$$V_t = 1 - (1-p)/2$$

where $p$ = line density measure, which renders threshold levels at which the line is exactly bounded by its dimensions.

Thus the signal charts shown in FIG. 6 illustrate the operation of the present invention. In particular, signal B is combined with signal G to form a signal $B_1$. Signal G corresponds to the peak detector 25 output while signal B corresponds to the preamplifier 15 output. Signal $B_1$ is therefore a sum of signals B and G or a normalized signal B. This signal is then compared with the signal C which corresponds to the rectified differentiator output. By proper selection of gains, the signal Q is obtained which is functionally related to the line width for various levels of contrast.

The many advantages of the present invention should now be readily apparent. The invention provides, by simple and expedient means, apparatus through which line detail dimensionally less than the size of an aperture can be discriminated. Such discrimination is essentially independent of line contrast.

Obviously, many modifications and variations of the present invention may be made with regard to the foregoing detailed description without departing from the spirit of the invention.

I claim:

1. In a scanning system including a transportable scanner adapted for translation over a medium having deposited thereon markings, said scanner producing an electrical signal indicative of the reflectivity of the sensed section of said medium, the improvement comprising:
   peak detecting means connected to receive said electrical signal for producing a peak signal indicative of the peak amplitude of said electrical signal,
   differentiating means operatively connected to receive said electrical signal for producing a rate signal indicative of the rectified first derivative of said electrical signal; and
   comparing means including summing means for combining said peak signal and said electrical signal, operatively connected to receive said electrical and rate signals and said peak signal for producing an output signal when the sum of said electrical signal and peak signal is greater than said rate signal.

2. Apparatus according to claim 1 wherein:
   said peak detecting and differentiating means each include an operational amplifier connected to receive said electrical signal at the inverting input terminals thereof.

3. Apparatus according to claim 2 wherein:
   said comparing means includes an operational amplifier connected to receive said rate, electrical and peak signals at the inverting terminal thereof.

4. Apparatus according to claim 3 further comprising:
   preamplifier means interposed in circuit with said electrical signal for adjusting the gain thereof.

5. Apparatus according to claim 4 wherein:
   said preamplifier means includes an operational amplifier having an adjustable resistive feedback.

6. Apparatus for detecting the presence of a marking on a paper comprising:
   sensing means adapted to scan said paper for producing an electrical signal indicative of the local reflectivity thereof;
   peak detector means connected to said sensing means for producing a peak signal indicative of the maximum amplitude of said electrical signal;
   differentiating means connected to said sensing means for producing a rectified rate signal corresponding to the absolute value of the first derivative of said electrical signal;
   means for combining said peak signal and said electrical signal; and
   comparator means operatively connected to receive said rate signal, and said combination of said electrical and peak signals for producing an output signal when said rate signal is less than the combination of said peak and electrical signals.

7. Apparatus according to claim 1 wherein:
   said differentiating means includes a differentiating circuit in series with a rectifying circuit.

8. Apparatus according to claim 6 wherein said peak detector means has a gain and said differentiating means has a gain and wherein said gains are equal.

9. Apparatus according to claim 1 wherein: said sensing means is transportable over said paper.

* * * * *